Figure 2:
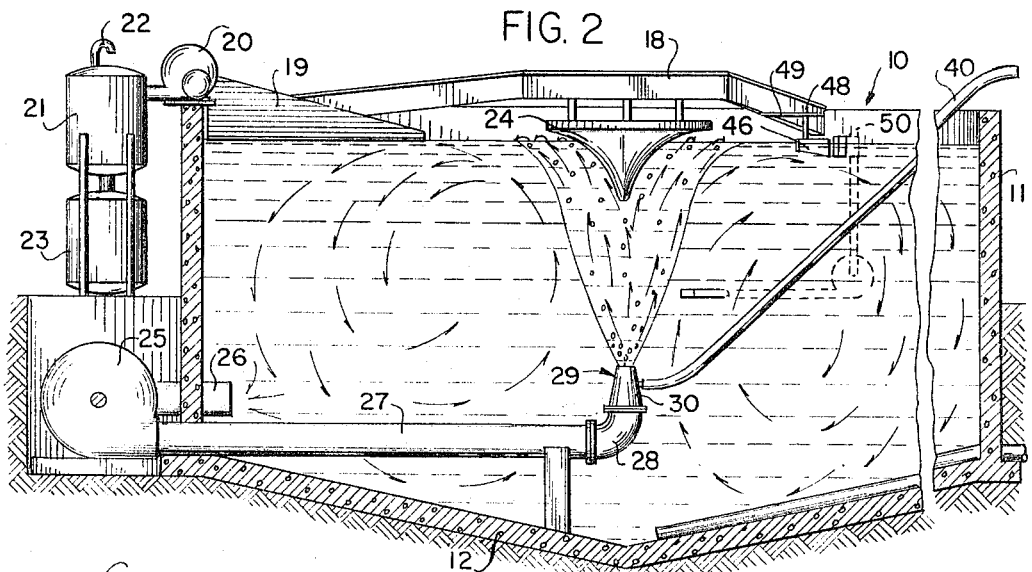

Sept. 6, 1966     J. M. VALDESPINO ET AL     3,271,304
VENTURI AERATOR AND AERATING PROCESS FOR WASTE TREATMENT
Filed June 26, 1964     3 Sheets-Sheet 1
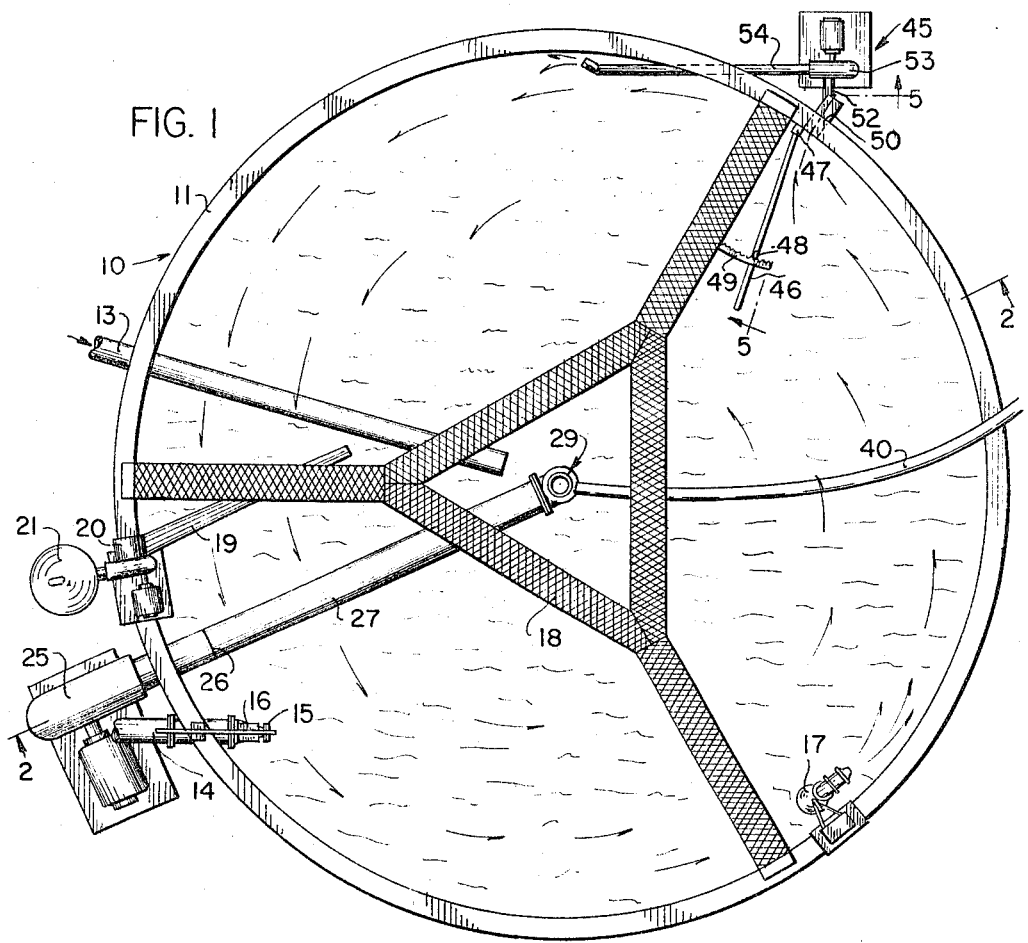
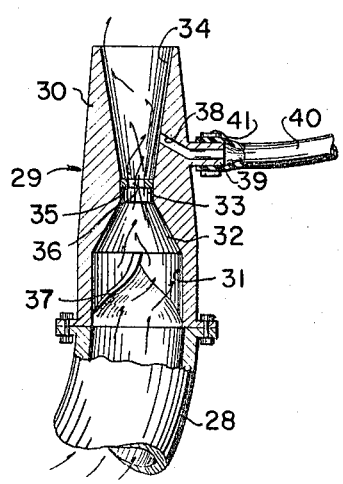
INVENTORS
JOE M. VALDESPINO
CLIFFORD B. COX
BY
ATTORNEYS Sept. 6, 1966 J. M. VALDESPINO ET AL 3,271,304
VENTURI AERATOR AND AERATING PROCESS FOR WASTE TREATMENT
Filed June 26, 1964 3 Sheets-Sheet 2

INVENTORS
JOE M. VALDESPINO
CLIFFORD B. COX

BY
ATTORNEYS

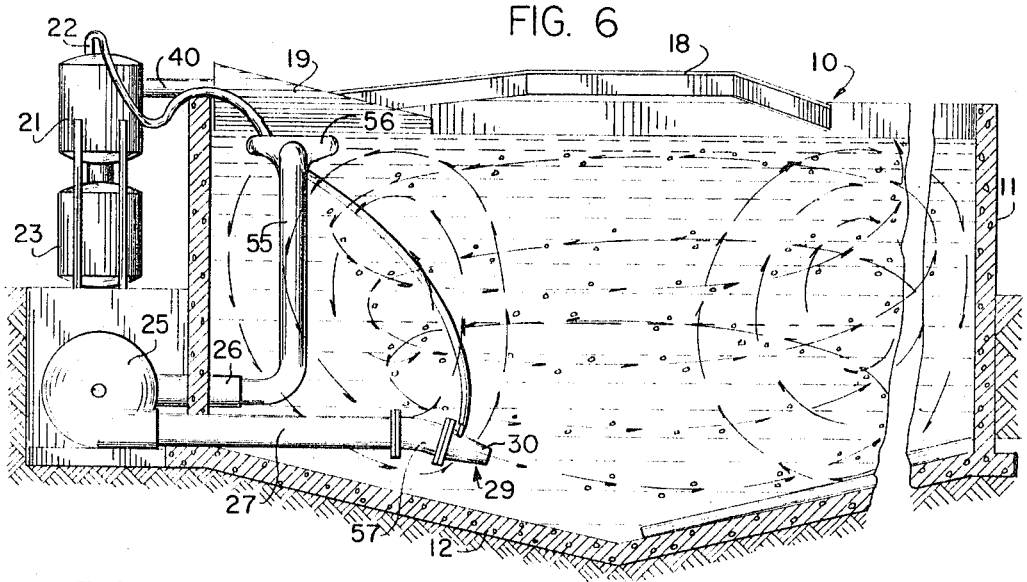
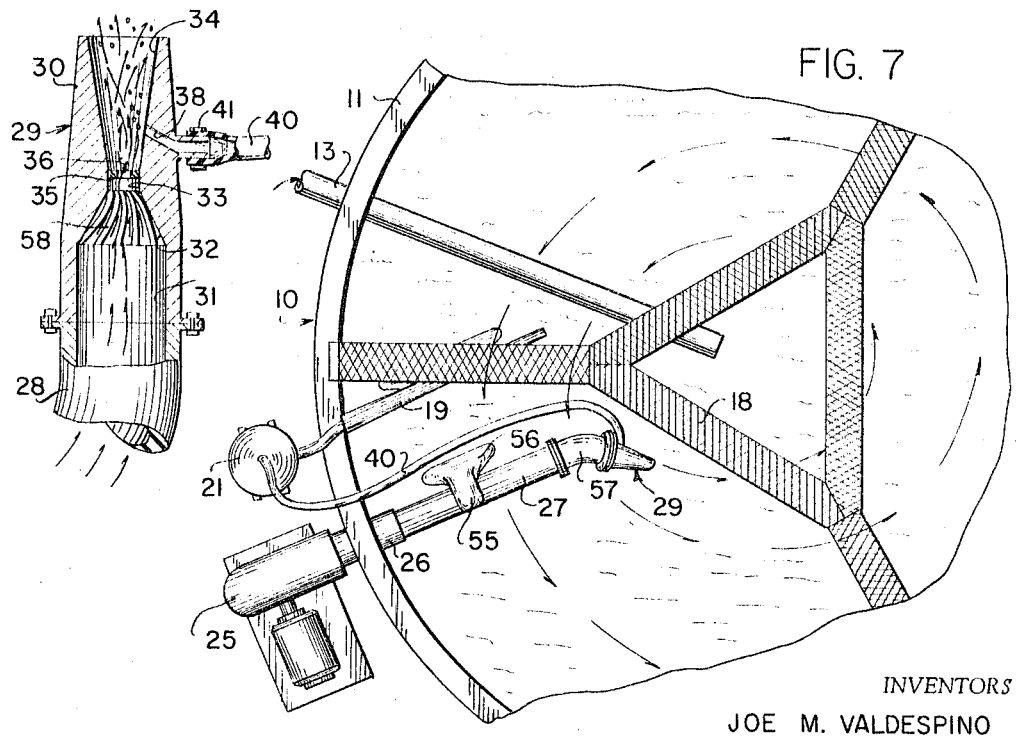
INVENTORS
JOE M. VALDESPINO
CLIFFORD B. COX

United States Patent Office 3,271,304
Patented Sept. 6, 1966

1

3,271,304
VENTURI AERATOR AND AERATING PROCESS FOR WASTE TREATMENT
Joe M. Valdespino, Orlando, Fla., and Clifford B. Cox, Chicago, Ill., assignors to Pacific Flush Tank Company, Chicago, Ill., a corporation of Illinois
Filed June 26, 1964, Ser. No. 378,320
17 Claims. (Cl. 210—15)

This invention relates to waste treatment of the aerobic type and to apparatus and equipment employed by which improved aeration of such waste is accomplished.

The invention relates particularly to the use of a venturi-type aspirator through which liquid waste is caused to flow and is intended to perform the functions of agitation, circulation, and mixing in order to provide optimum oxygen containing gas and liquid in waste containing fluids as well as to facilitate the introduction of a maximum amount of air into a moving stream of liquid.

This application is an improvement over prior applications 286,384 and 322,295.

Heretofore sewage has been treated over a prolonged period in a slow tedious process in which odors have not been eliminated and all of the solids have not been dissolved, resulting in pollution of the atmosphere, waters including stream, and injury to and sometimes destruction of plant and animal life. Certain of these problems have been reduced in a manner disclosed in the above identified applications and the time involved and purity of effluent material has been greatly improved, but nevertheless the problem of how to obtain additional and in fact maximum treatment has remained.

It is an object of the invention to increase the efficiency of an aerobic waste disposal system by increasing aeration within the system simply and economically, with minimum equipment, and in a minimum of time.

Another object of the invention is to provide apparatus for an aerobic waste treatment system in which air under atmospheric pressure is admitted into the fluid of the system at lowest level and under a static pressure head of the fluid of the system.

A further object of the invention is to provide a waste treatment system having a tank with liquid and waste material therein and utilizing a venturi-type aspirator, or other aspirating device, for creating a partially evacuated column of fluid with a specific gravity less than the remaining fluid in the tank, which serves to increase the amount of air entrained within the liquid of the system and to provide greater retention time for such entrained air, as well as to cause circulation between levels of the volume of the system.

A further object of the invention is the utilization of natural hydraulic forces to increase the amount of air admitted.

A still further object of the invention is to provide apparatus for removing floating digestible and non-digestible material from the surface of the system and for directing such material under pressure with or without an abrasive surface to accelerate and produce the disintegration and deterioration thereof.

Figure 3:
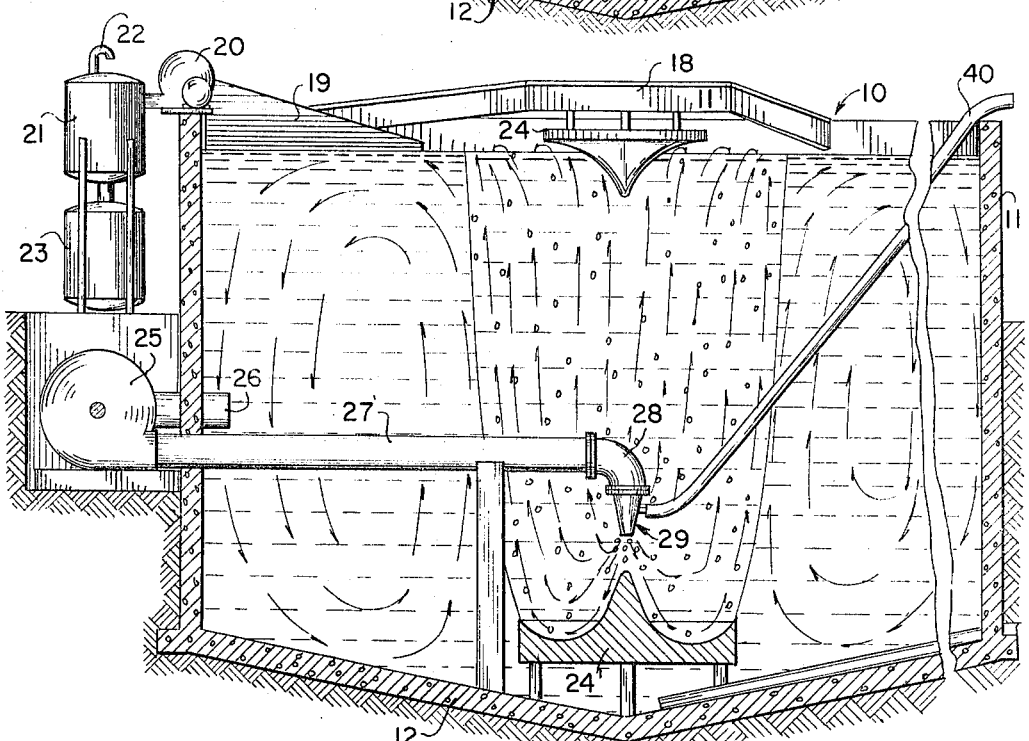

Other objects and advantages of the invention will be apparent from the following description taken in conjunction with the accompanying drawings in which:

FIG. 1 is a top plan view of an aeration tank illustrating one application of the invention;

FIG. 2, a vertical section along the line 2—2 of FIG. 1, in which the aspirator-aerator nozzle is directed upwardly;

FIG. 3, a similar view with such nozzle directed downwardly;

FIG. 4, an enlarged longitudinal section through the aspirator nozzle;

2

FIG. 5, a fragmentary vertical section on the line 5—5 of FIG. 1, illustrating the surface skimming device;

FIG. 6, a vertical section of a modified form of the invention in which the venturi-type aspirator nozzle is arranged for tangential discharge;

FIG. 7, a fragmentary top elevation of the structure of FIG. 6; and

FIG. 8, an enlarged longitudinal section similar to FIG. 4 of a modified form of nozzle.

Briefly stated the present invention is an aeration unit for use in a waste treatment system, such unit including a tank having side and bottom walls for the reception of raw waste to be treated by an aerobic process and means for producing flow through a venturi-type aspirator, or other aspirating device, and for admitting atmospheric air into the flow on the discharge side of the venturi to produce greater aeration and the subsequent disintegration and decomposition of the digestible waste material, the separation and removal of the non-digestible material, and the elimination of noxious gases.

With continued reference to the drawings, an aerobic waste treatment tank 10 is provided having generally circular side walls 11 with an inverted generally conical bottom 12. Waste material such as raw sewage or sewage transferred from another tank is introduced into the tank 10 through an influent pipe 13 and treated liquid is removed from the tank in any desired manner as, for example, through an effluent pipe 14 under the influence of a gate 15 controlled by a float 16. It is noted that the particular configuration of the tank and the means for introducing and discharging fluid therefrom form no part of the present invention and are for illustrative purposes only.

One or more fluid pumps 17 may be disposed about the periphery of the tank to impart a rotary motion generally in a horizontal and tangential direction to the solids-bearing liquid in a manner similar to that disclosed in application 322,295. If desired, a delta-type catwalk 18 may be located over the open top of the tank 10 to provide for visual inspection of the contents of the tank and to provide access to the central portion thereof as well as to provide convenient access to apparatus situated around the periphery of the tank.

A device for removing foam from the surface of the contents of the tank 10, such as that shown in application 320,569, may be mounted on and adjacent to the wall 11 of the tank. Such device includes a hood 19 extending from the rim or periphery of the tank generally radially inwardly toward the center thereof. The hood 19 may be connected to a vacuum pump 20 for removing suds or foam from the surface of the liquid and for discharging such foam into a separator tank 21 utilized for reducing the foam to liquid and gaseous states and discharging the gas through an outlet 22 to the atmosphere and discharging the liquid into a collector tank 23 for disposal.

The present inventive concept is to introduce or admit air under but not limited to atmospheric pressure into the lower portion of the tank in such a manner that the air is entrained within the liquid of the tank to accelerate the flow of the liquid and disintegration and digestion of the solids within such liquid. In order to do this, a pump 25 is provided adjacent to the bottom of the tank 10 and such pump receives fluid from the tank 10 or from a contiguous tank (not shown) through an inlet pipe 26 and discharges such fluid back into the tank through a discharge pipe 27. The inlet and discharge pipes are arranged in a manner that the static pressure head of the inlet and outlet will be substantially equal so that the power unit required for driving the pump will be maintained at a minimum.

The inner end of the discharge pipe 27 extends inwardly to a position substantially centrally of the tank 10. An elbow 28 is attached to the free end of the discharge pipe 27 and a venturi-type aspirator 29 is connected to the opposite end of such elbow. As illustrated in FIG. 2, the venturi-type aspirator 29 may be disposed in an upwardly discharging position; as illustrated in FIG. 3, the aspirator may be disposed in a downwardly discharging position; and as illustrated in FIG. 6, the aspirator may be disposed at an angle, either upward or downward, and arranged to discharge material substantially tangentially of the circular flow of material within the tank.

The aspirator includes a body 30 having a generally cylindrical bore 31 at one end terminating in a tapered frustoconical high pressure inlet portion 32 connected to a reduced or constricted throat 33 which in turn is connected to a diverging or flaring frusto-conical discharge portion 34. The diameter at the mouth of the discharge portion is substantially less than the diameter of the cylindrical bore to attain maximum velocity of the fluid therethrough. A ring 35 having an opening 36 is disposed within the throat 33 to provide a sharp-edged opening through which the liquid must travel to enhance turbulence within the stream as well as to accelerate the rate of flow therethrough, and encourage a strong negative pressure in the frusto-conical discharge portion 34.

In order to disrupt the laminar flow of fluid through the aspirator, a vane or auger 37 is disposed within the cylindrical bore 31 and such vane is twisted substantially 90° along its longitudinal axis to impart a rotary motion to the flow of material and thereby cause turbulence and a spiral effect as the liquid is forced through the orifice 36 into the discharge portion 34. It is contemplated that the elbow 28 also will partially disrupt the laminar flow of fluid and will impart a rotary spiral motion to such fluid due to the tangential angularity thereof. The degree of spiral will be in direct proportion to the force of the fluid and the angularity of the elbow. In some instances, the angularity of the elbow will be sufficient to impart the desired spiral flow so that the vane 37 may be omitted.

When the fluid is forced through the orifice 36, a negative pressure is created in the discharge portion 34 of the aspirator and such negative pressure normally will tend to resist and retard the flow of fluid and thereby reduce the velocity of the discharged fluid. Also, the increasing cross-sectional diameter will permit the flow to enlarge and the coefficient of friction between the fluid and the surface of the diverging portion of the venturi likewise will tend to decrease the velocity of the fluid.

In order to overcome the negative pressure in the discharge portion and to accelerate further the velocity of the fluid being discharged, air under atmospheric or other pressure is admitted or introduced into the discharge portion 34. This is accomplished by providing an orifice 38, or series of orifices or an annular groove, in the discharge portion 34 in spaced relation to the throat 33, and such orifice 38 extends outwardly through an enlargement 39 projecting outwardly from the body 30. A hose or conduit 40 is connected to the enlargement 39 by a clamp 41 or the like, and such hose may extend upwardly so that the opposite end either is exposed to the atmosphere or, if desired, such hose may be connected to a source of air under pressure (not shown).

The orifice 38 preferably is disposed in a position that fluid passing through the orifice 36 in a generally spiral manner will pass over the orifice 38. Air within the hose 40 under either atmospheric pressure or pressure from a pump (not shown) will be discharged into the circulating fluid by the negative pressure of such fluid, and such air will be entrained within the fluid while still in the discharge portion 34 to relieve the negative pressure of such fluid as well as to reduce the surface friction and thereby increase the velocity of the fluid as it is discharged from the aspirator. The entrained air will be in the form of small bubbles having relatively large surface area in proportion to the volume and consequently the chemical and bacteriological benefit is much more effective and efficient than conventional applications of compressed air. The drawing of the air through the orifice 38 tends to compress the air slightly and as the column of water passing through the aspirator begins to spread out and slow down in the diverging discharge portion, such compressed air will again expand to further accelerate the flow of liquid from the aspirator. Also, the introduction of air into the liquid will reduce the specific gravity of such liquid so that the pressure of the heavier liquid will further accelerate the flow of the lighter liquid. If desired, a plurality of orifices may be disposed along the length of the discharge portion of the aspirator or a slot may be employed to entrain additional air in the fluid.

The mixture of liquid and air discharged from the aspirator 29 will create a partially evacuated column of fluid above the aspirator, and the air entrained in such evacuated column will reduce the specific gravity and therefore the static pressure of the fluid above the aspirator. This will produce a circular movement in a vertical and radial direction of the fluid within the tank. If desired, an inverted conical member 24 may be suspended from the catwalk 18 and may have its lower end disposed below the liquid level to further induce a circular radial movement in both vertical and horizontal directions of the liquid within the tank. The combination of the vertical and radial flow created by the evacuated column and the conical member 24 and the horizontal or tangential flow caused by the fluid pump 17 will impart a swirling twisting motion to the fluid and the solids therein. This movement combined with the maximum retention of air in the liquid and solids causes the rapid disintegration and deterioration of such solids as well as the destruction or prevention of noxious gases in a minimum of time.

As illustrated in FIG. 3, the aspirator may be directed in a downward direction to cause the material to be discharged against a conical member 24' adjacent to the bottom of the tank so that the diameter of the evacuated column will be greater than the diameter of the column from the aspirator which is directed upwardly and the air entrained therein will be retained for a greater length of time. The added turbulence caused by the flow of fluid and solids against the member 24' will further assist in the disintegration of the solids. Also the upper conical member 24 will induce a circular radial flow in both vertical and horizontal directions as previously described to retain the entrained air for a longer period of time and increase the chemical and bacteriological effect.

In order to cause the disintegration of floating digestible and non-digestible material, a surface skimming device 45 (FIGS. 1, 2 and 5) may be provided and includes a baffle 46 pivotally mounted on lugs 47 connected to the inner side wall of the tank above and below the normal water level. The baffle 46 has an upwardly projecting post 48 intermediate the ends thereof, and such post engages a serrated arcuately disposed locking member 49 connected to the catwalk 18 and adapted to maintain the baffle in adjusted position. The baffle extends across the circular surface flow of the fluid within the tank and normally is slightly inclined horizontally to direct the movement of any solids which it contacts toward the base of the baffle.

An opening 50 is provided in the side wall 11 and such opening extends above and below the normal water level. A chute 51 is located within such opening and is adapted to receive fluid and any floating solid matter from the surface of the tank. The opposite end of the chute 51 is connected to a downpipe 52 which directs fluid from the chute 51 into a pump 53, and such pump forces the solids-bearing fluid through a discharge pipe 54 back into the tank 10 preferably at a lower level. The free end of the pipe 54 may be inclined to direct the solids-bearing liquid against the side wall of the tank or against some other target or abrasive surface to cause distintegration of the solids. If desired, the discharge pipe 54 may extend substantially tangential to the tank 10 or may extend inwardly toward the central portion of such tank so that the internal forces within the pump will cause the liquid to flow at a faster rate than the solids in suspension and thereby cause the disintegration of such solids.

It is noted that the surface skimming device 45 may be mounted on the tank adjacent to the pump 25 in such a manner that the downpipe 52 may be connected to the inlet pipe 26 so that the digestible and non-digestible floating matter will be discharged through the aspirator 29.

As illustrated in FIGS. 6 and 7, a modified form of the invention is disclosed in which the surface skimming device 45 has been omitted and the inlet pipe 26 is connected to a downpipe 55 having a flared scoop-type nozzle 56 located slightly below the liquid level of the fluid within the tank 10. The floating digestible and non-digestible solid matter is drawn into the nozzle 56 and caused to disintegrate and be digested since the fluid which is introduced into the downpipe 55 will travel at a higher rate of speed than the solid matter and will tend to stretch the solid matter in a manner to cause portions thereof to break off. The impeller blades of the pump 25 likewise will cause disintegration of the solids through contact therewith.

In this modification, the discharge pipe 27 has an angularly disposed member or elbow 57 mounted on its inner end, such member being connected to a venturi-type nozzle 29. The nozzle is disposed at an angle either upwardly or downwardly with respect to the discharge pipe 27 as well as at an angle horizontally to discharge the fluid at an angle substantially tangential to the circular path of the fluid within the tank caused by the pump 17. The entrained air will decrease the specific gravity of the fluid being discharged from the nozzle and when combined with the tangential discharge, a swirling spiral flow will result which will retain the air in suspension for a prolonged period of time. It is noted that the longer the air is entrained, the greater the chemical and bacteriological effect on the digestible matter will be and a more rapid digestion and disintegration will result. It is possible that tangential discharge from the nozzle 29 will be sufficient to cause a swirling spiral flow of the liquid, in which case the number of pumps 17 may be decreased or eliminated in toto.

If desired, the air inlet hose or conduit 40 may be connected to the gas outlet 22 of the foam removing device (FIGS. 6 and 7). The vacuum or negative pressure created within the nozzle 29 will provide sufficient suction to draw foam from the hood 19 directly into the separator tank 21 so that the vacuum pump 20 will not be required.

With reference to FIG. 8, a modified form of nozzle is disclosed in which the laminar flow of the liquid is disrupted and turbulence is induced thereto by a series of angularly disposed grooves or riflings 58 within the frusto-conical high pressure inlet portion 32.

In the operation of the device, raw or partially treated waste matter is introduced into the tank 10 through the influent pipe 13 until the tank is substantially filled with waste contained in liquid and the pumps 17, disposed at the desired levels, will cause pronounced circulation of the liquid. Fluid within the tank is removed therefrom through the inlet pipe 26 by the pump 25 and discharged through the pipe 27 and the venturi-type aspirator 29 into the tank. The discharge from the aspirator creates an evacuated column of less specific gravity than the remainder of the fluid within the tank so that the static pressure head on the inlet will be greater than the static pressure head on the discharge end of the device so that a minimum drive means for the pump can be utilized. The venturi-type aspirator 29 connected to the free end of the discharge pipe includes means on the pressure side of the aspirator for producing turbulence therein and an orifice within the constricted throat portion of the aspirator for increasing the velocity of the flow of fluid therethrough. An orifice 38 on the discharge portion of the aspirator is connected to a source of air either under atmospheric pressure or to a pressure creating device and such air is entrained with the liquid. The combined air and liquid causes the discharge from the nozzle to be accelerated and the entrained air creates a chemical and bacteriological reaction with the solids suspended therein to cause rapid disintegration and digestion thereof.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. Apparatus for circulating and aerating waste material within a tank comprising a pump, an inlet pipe and a discharge pipe connected to said pump, said discharge pipe extending into said tank substantially to the center thereof, a venturi-type aspirator connected to the free end of said discharge pipe, said aspirator including a body having a frusto-conical high pressure side, a constricted throat and a frusto-conical negative pressure side having an outlet, said negative pressure side having an orifice located between said outlet and said throat, means for connecting said orifice to a source of air, and means in the high pressure side of said aspirator for causing turbulence of said waste material, whereby air will be entrained in said material to increase the velocity of flow through the aspirator and to create a partially evacuated column in said material and cause movement between levels thereof.

2. The structure of claim 1 in which said inlet pipe and said aspirator are located at substantially the same level in said tank.

3. The structure of claim 1 in which said aspirator is directed upwardly.

4. The structure of claim 1 in which said aspirator is directed downwardly.

5. The structure of claim 1 in which said aspirator is disposed at an angle to the horizontal and discharges waste material tangentially to the circulating movement of material within said tank.

6. The structure of claim 1 including means for removing floating matter from said tank and for accelerating the disintegration thereof.

7. An aspirator for aerating a liquid within a tank comprising a body located in the lower portion of said tank and substantially centrally thereof, said body including a generally cylindrical bore, a frusto-conical high pressure convergent inlet portion, a constricted throat portion, and a frusto-conical negative pressure divergent discharge portion having an outlet, said body having an air orifice located between said outlet and said throat portion and in communication with said divergent portion, means for connecting said orifice to a source of air, and means in said bore for imparting a spiral motion to said liquid, whereby liquid under pressure passing through said constricted throat will create a negative pressure in said divergent portion to draw air through said orifice and entrain said air in the liquid to increase the velocity of flow thereof.

8. Apparatus for circulating and aerating a body of liquid within a tank comprising an aspirator located within said liquid, pump means for producing flow of liquid through said aspirator, said aspirator including a frusto-conical high pressure convergent inlet portion, a constricted throat portion and a frusto-conical negative pressure divergent discharge portion having an outlet, said aspirator having at least one orifice located between said outlet and said throat portion and in communication with said divergent discharge portion, and means for connecting said orifice to a source of air, whereby liquid under pressure passing through said aspirator will create a negative pressure in said divergent discharge portion to draw air through said orifice and entrain said air in the liquid to increase the velocity of flow thereof.

9. The structure of claim 8 in which the liquid and entrained air are discharged directly into said body of liquid.

10. The method of introducing air under atmospheric pressure into a body of liquid contained in a tank comprising the steps of removing liquid from said tank, pumping the removed liquid through an elbow to change its direction of flow, then through a swirling mechanism to impart a swirling motion to said liquid and then forcing the swirling liquid through a venturi type aspirator having a high pressure inlet portion, a constricted throat portion and a negative pressure discharge portion having an outlet, providing an orifice between said outlet and said throat portion in communication with said discharge portion of said aspirator, connecting said orifice to a source of air under atmospheric pressure, and discharging said liquid from said aspirator directly into the body of liquid, whereby the negative pressure created in said discharge portion will draw air through said orifice and entrain said air in the liquid being discharged from said aspirator.

11. Apparatus for circulating and aerating waste material within a tank, comprising
   a pump,
   an inlet pipe connected to the inlet of said pump for supplying waste material to said pump,
   a discharge pipe connected to the outlet of said pump,
   said discharge pipe extending into said tank substantially to the central vertical axis thereof,
   venturi-type aspirator means connected to the free end of said discharge pipe and having an outlet directed parallel to and substantially along said central vertical axis for admitting air into the contents of said tank and for disintegrating solids entrained in said waste material,
   said aspirator including a high pressure inlet side connected to said discharge side; a constricted throat disposed between said inlet side and said outlet; and structure defining an orifice opening into said aspirator between said throat and said outlet,
   a conduit connected between said orifice and a source of air, and
   baffle means mounted along said vertical axis in spaced apart relationship from the material discharged from said aspirator into said tank to a toroidal flow path in said tank.

12. Apparatus according to claim 11 wherein
   said aspirator is located near the bottom of said tank and said aspirator outlet faces toward the top of said tank, and
   said baffle means comprises a baffle member located above said outlet and submerged a small distance below the level of waste material in said tank.

13. Apparatus according to claim 11 wherein
   said aspirator is located near the top of said tank and said aspirator outlet faces toward the bottom of said tank, and
   said baffle means comprises a baffle member located below said outlet near the bottom of said tank.

14. Apparatus according to claim 11 wherein
   said aspirator faces toward the bottom of said tank, and
   said baffle means comprises a first baffle located near the bottom of said tank for redirecting the waste material discharged from said aspirator toward the top of said tank, and a second baffle located near the top of said tank for causing said waste material to travel in said toroidal path.

15. Apparatus according to claim 11 wherein
   said aspirator faces toward the top of said tank, and
   said baffle means comprises a first baffle located near the top of said tank for redirecting the waste material discharged from said aspirator toward the bottom of said tank, and a second baffle located near the bottom of said tank for causing said waste material to travel in said torodial path.

16. Apparatus according to claim 11 comprising
   means in the high pressure side of said aspirator for imparting a spiral motion to said waste material passing through said aspirator.

17. An aspirator according to claim 7 further comprising an elbow connected to said bore for changing the direction of flow of liquid just prior to the entrance thereof into said bore.

References Cited by the Examiner

UNITED STATES PATENTS

| 719,273 | 1/1903 | Stuart | 210—194 X |
| 996,560 | 6/1911 | Bradley | 210—194 X |
| 1,976,062 | 10/1934 | Estep | 239—403 |
| 2,953,306 | 9/1960 | Dijkstra | 261—76 X |
| 3,192,146 | 6/1965 | Vellas et al. | 210—169 X |

FOREIGN PATENTS

| 878,949 | 10/1961 | Great Britain. |

MORRIS O. WOLK, *Primary Examiner.*

MICHAEL E. ROGERS, *Examiner.*